United States Patent [19]

Ward et al.

[11] 3,898,394

[45] Aug. 5, 1975

[54] WALL TELEPHONE ADAPTER ASSEMBLY

[75] Inventors: Ronald C. Ward; Ronald M. Kenny; Richard B. Kosten, all of Huntsville, Ala.

[73] Assignee: GTE Automatic Electric Laboratories Incorporated, Northlake, Ill.

[22] Filed: Sept. 27, 1974

[21] Appl. No.: 509,764

[52] U.S. Cl. .............................. 179/146 R; 179/178

[51] Int. Cl.² .............................. H04M 1/11

[58] Field of Search ........ 179/100 R, 100 C, 146 R, 179/147 R, 178, 179, 189 R

[56] References Cited

UNITED STATES PATENTS 3,840,711 10/1974 Tucker .............................. 179/146 R 3,849,608 11/1974 Bustos et al. .............................. 179/146 R 3,859,476 1/1975 Morrell et al. .............................. 179/100 C

*Primary Examiner*—Kathleen H. Claffy

*Assistant Examiner*—Randall P. Myers

[57] ABSTRACT

An adapter assembly is disclosed for converting a standard wall telephone to a modular type telephone which may be installed and removed from a wall jack by the telephone customer. The adapter assembly includes a pair of apertures which mate with mounting studs on a wall plate and further includes a movable plug and a locking bar for retaining the adapter assembly and wall telephone in place on the mounting studs of the wall plate.

5 Claims, 4 Drawing Figures

WALL TELEPHONE ADAPTER ASSEMBLY

BACKGROUND OF THE INVENTION

This invention relates generally to the field of telephone station apparatus, and more particularly to an adapter assembly for receiving a standard wall telephone and providing a releasibly engagable connection between the adapter assembly and a wall-mounted plate which includes a jack for receiving the electrical connections from the telephone set.

SUMMARY OF THE INVENTION

The adapter assembly of the present invention provides an exemplarly means of converting a standard wall telephone set, which is customarily installed at the customer's premises by a telephone installer, into a modular unit which the user can install at a premises having an appropriate mounting plate, with mounting studs and a jack for receiving the plug incorporated in the adapter assembly. The adapter assembly includes a pair of apertures which receive the mounting studs of the wall plate, these apertures being located in a recessed area thereof which lies intermediate the front and rear surfaces of the adapter assembly, such that once the adapter assembly is engaged with the mounting studs the rear surface of the adapter assembly will fit substantially flush with the wall surface to which the wall-mounted plate is attached.

The adapter assembly further includes a spring biased locking bar which is initially positioned to allow the adapter assembly to be engaged with the mounting studs and once engagement has been accomplished it then released to lock the adapter assembly and telephone set into rigid engagement with the wall-mounted plate. This exemplarly locking bar is slidably supported in the adapter assembly, and includes a cut-out which, when the bar is moved against the spring bias, aligns with one of the mounting studs and allows the adapter assembly to be moved into or out of engagement with the mounting studs and hence installed or removed from the wall.

DESCRIPTION OF THE PREFERRED EMBODIMENT

Figure 1:
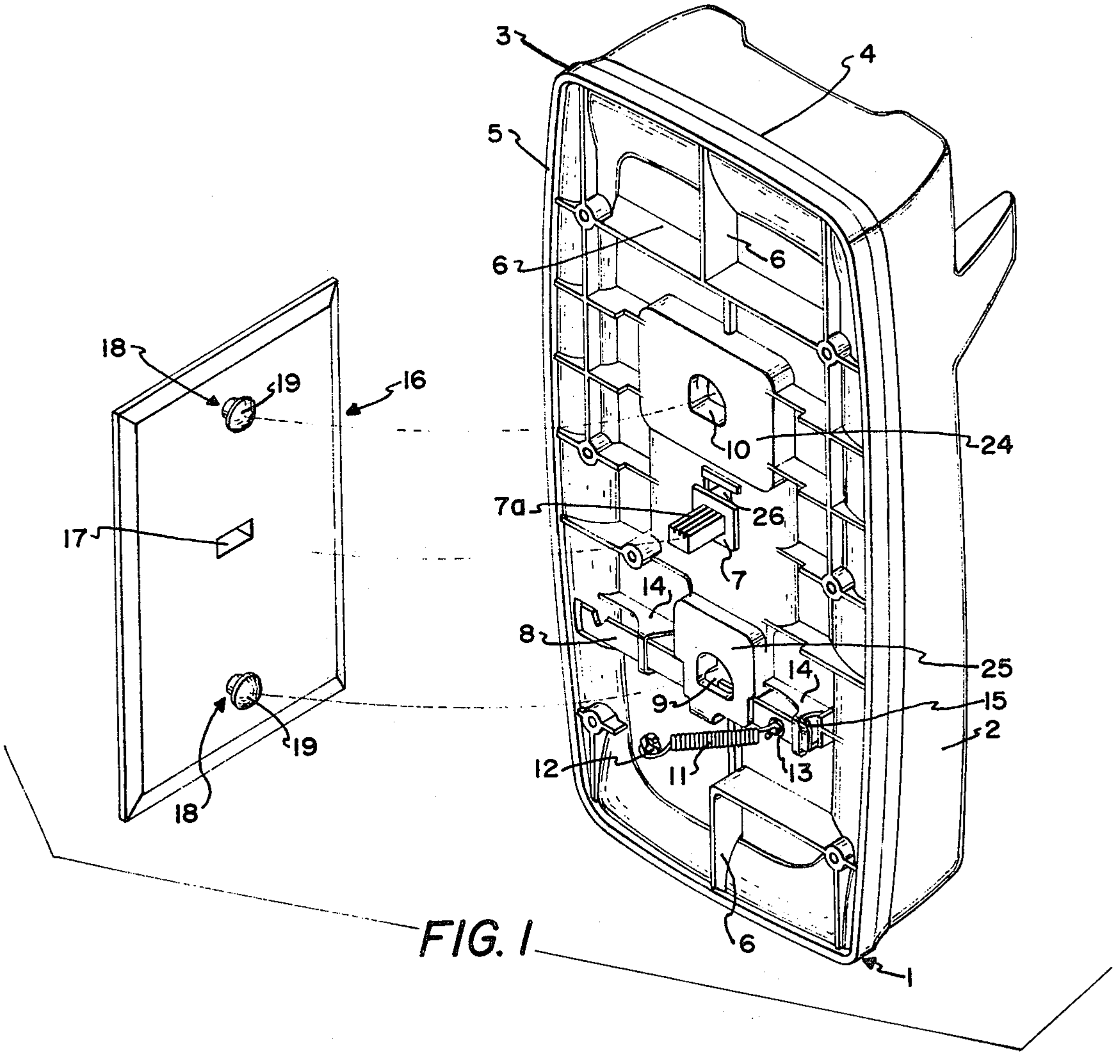
FIG. 1 illustrates in perspective the telephone adapter assembly of the present invention with a telephone set attached to the front surface thereof, and further illustrates a wallmountable receptacle plate having a pair of mounting studs and an electrical connector jack included therewith.

Referring to FIG. 1, there is illustrated in perspective view adapter assembly 1 which is shown in conjunction with a telephone set 2. The adapter assembly is composed primarily of unitary molded base plate 3 which is adapted to receive along front edge 4 thereof telephone set 2. The rear surface of base plate 3 terminates in rim 5, which when adapter assembly 1 and telephone set 2 are in place on a wall will be substantially flush with the wall surface. To increase the rigidity of base plate 3, various stiffening ribs 6 have been integrally molded along the interior surface of base plate 3.

The adapter assembly further includes an electrical plug 7 which is slidably supported in base plate 3 and is utilized to bring the electrical connection from telephone set 2 to the wall jack through contact strips 7*a*. Also included in adapter assembly 1 is locking bar 8 which is slidably supported in base plate 3 adjacent to aperture 9. Spring 11 normally biases locking bar 8 in position illustrated in FIG. 1, one end of spring 11 being secured to post 12 of base plate 3 and the other end of spring 11 being secured in notch 13 of locking bar 8. It will be noted in FIG. 1 that locking bar 8 is supported by a pair of channel members 14 which are molded as part of base plate 3. Locking bar 8 included on the right end, as viewed in FIG. 1, a tab 15 which is bent outward to prevent spring 11 from completely disengaging locking bar 8 from channel member 14 adjacent tab 15.

The purpose of adapter assembly 1 is to provide a simplified manner for user-customer to connect and disconnect telephone set 2 with a wall-mounted receptacle plate without the necessity of hand wiring the connections between the incoming telephone line on the premises and the telephone set. In FIG. 1 wall-mountable receptacle plate 16 is illustrated in perspective view in space with the wall to which it would be attached omitted. Receptacle plate 16 includes electrical jack 17 for receiving electrical plug 7 of adapter assembly 1. Also included on receptacle plate 16 are a pair of mounting studs 18, each including flange 19 on the free end thereof. As illustrated in FIG. 1 by the dashes lines extending between recpetacle plate 16 and adapter assembly 1, lower mounting stud 18 cooperates with aperture 9 and upper stud 18 cooperates with aperture 10 and electrical jack 17 with plug 7 to provide a mating relationship between adapter assembly 1 and receptacle plate 16.

Briefly, to attach telephone set 2 and adapter assembly 1 to wall plate 16, alignment as shown in FIG. 1 is first established and locking bar 8 depressed against the bias of spring 11. The free end of plug 7 is inserted into jack 17 and further movement of adapter assembly 1 toward receptacle plate 16 will then allow mounting studs 18 to be inserted into apertures 9 and 10. Once flanges 19 have entered apertures 9 and 10 and extend beyond the wall section adjacent to those apertures, the adapter assembly 1 and telephone set 2 are then moved downward and locking bar 8 released which results in locking the adapter assembly 1 and telephone set 2 to wall plate 16.

Figures 2, 3, 4:
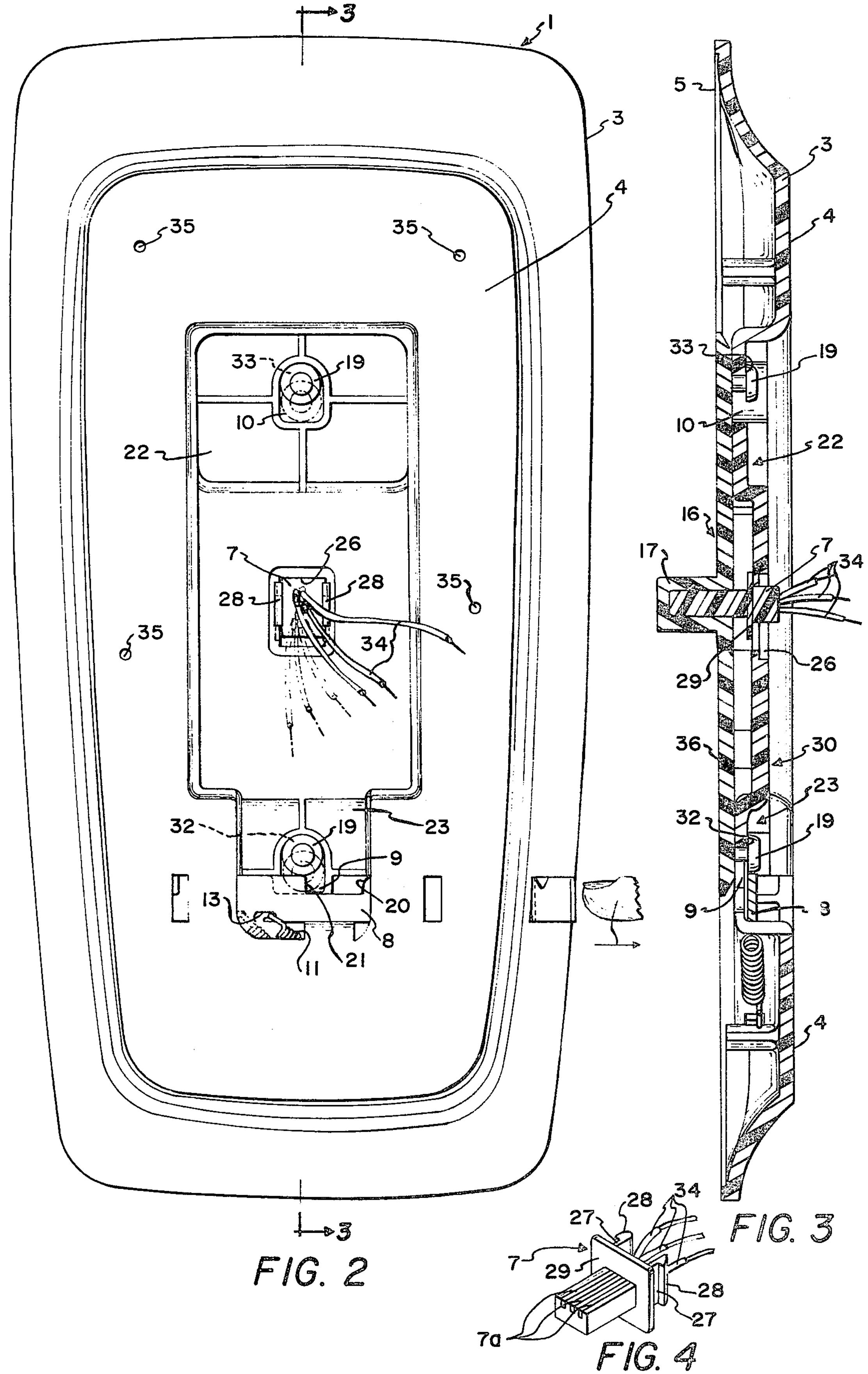
FIG. 2 is a plane view of the front portion of the adapter assembly of the present invention.
FIG. 3 is a sectional view taken along lines 3—3 of FIG. 2.
FIG. 4 is a perspective view of the electrical plug as used in the adapter assembly of the present invention.

The manner of installing adapter assembly 1 and telephone set 2 rigidly to the receptacle plate 16 will better be appreciated by reference to FIGS. 2 and 3. In FIG. 2 telephone set 2 has been eliminated to provide a clear view of the manner in which mounting studs 18 are inserted and locked into place on adapter assembly 1. In FIG. 2, flanges 19, electrical plug 7 and a portion of locking bar 8 which are shown in dotted line representation indicate the position of these elements upon initial installation onto receptacle plate 16, and the full line representation of these elements indicate their position after adapter assembly 1 has been locked into place on receptacle plate 16. To install adapter assembly 1 on receptacle plate 16, in amplification of the above noted installation procedure, locking bar 8 is moved to the left as viewed in FIG. 2 so that slot 20, located along its upper edge, is positioned to the left as shown in dotted line representation and edge 21 falls in the dotted line position as illustrated. Next the adapter assembly is moved inward with electrical plug 7 in the dotted line position and then plug 7 is inserted into electrical jack 17. With adapter assembly 1 in this position, flanges 19 enter apertures 9 and 10 in the dotted line representation position. After this installation portion has been completed, adapter assembly 1 is moved downward, which then moves flanges 19 into the full line position as illustrated in FIG. 2 and then locking bar 8 may be released which leaves it in the full line position illustrated in FIG. 2.

With adapter assembly 1 in the position shown in FIG. 2, with all elements in full line representation, locking bar 8 is positioned to the right such that left-hand edge 21 of slot 20 is moved beyond the center of lower stud 18 and against the upper edge of locking bar 8 which prevents adapter assembly 1 from being moved such that mounting stud 18 may become free from adapter assembly 1. To better appreciate this locked condition, attention is directed to FIG. 3. The sectional view of FIG. 3 is taken with the elements of FIG. 2 as shown in full line representation. As illustrated in FIG. 3, base plate 3 is recessed in areas 22 and 23 into which apertures 10 and 9 respectively are provided. As shown in FIG. 1, recessed areas 22 and 23 include rear surfaces 24 and 25 respectively and when adapter assembly 1 is fully engaged with receptacle plate 16 rear surfaces 24 and 25 are pressed against the front surface of plate 16 as illustrated in FIG. 3. In this position with adapter assembly 1 moved downward with respect to receptacle plate 16, the rear surface of upper edges of flanges 19 lie in front of the upper edges 32 and 33 of apertures 9 and 10 respectively and hence adapter assembly 1 may not be removed from receptacle plate 16. To insure the maintenance of this locking position, spring loaded locking bar 8 is retained in the position as shown in FIG. 2 and as illustrated in FIG. 3 locking bar 8 prevents adapter assembly 1 from moving upward to allow flanges 19 to pass through apertures 9 and 10. Hence adapter assembly 1 and telephone set 2 may be locked into position on receptacle plate 16 to prevent accidental disengagement thereof from receptacle plate 16.

Referring to FIGS. 2, 3, and 4, electrical plug 7 is slidably supported in aperture 26 of base plate 3 and is retained in place in aperture 26 by resilient arms 27 which terminate in flared portions 28. With electrical plug 7 snapped into place in aperture 26, flared portions 28 ride on the inner edge of aperture 26 and plate 29 rides along the rear surface of base plate 3, adjacent aperture 26, in recessed area 30. Recessed area 30 of base plate 3 provides support for electrical plug 7 below the front edge 4 and hence prevents interference between plug 7 and the rear surface of telephone set 2.

Electrical conductors 34 extending from plug 7 are connected to contact strip 7*a* of plug 7 and provide electrical connection from strips 7*a* to telephone set 2. Conductors 34 are connected to telephone set 2 and then set 2 is secured adapter assembly 1 through the use of suitable fasterners which are engageable with openings 35 in base plate 3. For the sake of simplicity the electrical connections to jack 17 have been omitted. From FIG. 3 it will be appreciated that with plate 16 locked into engagement with adapted assembly 1, rim 5 and rear surface 36 of plate 16 lie along the same line. Hence with plate 16 surface mounted on a wall, rim 5 will extend to and mount substantially flush with the wall. Thus telephone set 2 and adapter assembly 1 will conceal wall plate 16 when these units are locked into engagement with wall plate 16, and a view of these units from the front would give the impression that adapter assembly 1 and telephone set 2 were secured flush to the wall in a conventional manner. It will of course be appreciated that by appropriate selection of the depth of recesses 22 and 23, taken in conjunction with the thickness of wall 3 in recess areas 22 and 23, flush mounting of adapter assembly 1 for various thickness of wall plates may be accomplished.

It will of course be appreciated by those skilled in the art that minor variations of the adapter assembly described herein may be made without departing from the scope of the invention.

We claim:

1. An adapter assembly for receiving a telephone set in rigid attachment thereto, said adapter assembly being adapted to be releasibly secured to a wall-mounted receptacle plate having a pair of mounting studs extending outwardly therefrom and an electrical jack for making connections to said telephone set, said adapter assembly comprising:

a unitary base plate having a front surface for receiving said telephone set and a recessed wall area joined with said front surface, said recessed wall area including first and second apertures adapted to receive said mounting studs and a third aperture for receiving an electrical plug;

an electrical plug slidably supported in said third aperture; and a locking bar slidably supported by said base plate adjacent to one of said stud receiving apertures for selectively locking said base plate to said mounting studs.

2. The adapter assembly as claimed in claim 1, wherein said mounting studs include flanged ends which cooperate with wall portions adjacent their respective apertures such that when said adapter assembly is mounted to said wall plate said adjacent wall portions extend behind said flanges to prevent removal of said adapter assembly from said mounting plate.

3. The adapter assembly as claimed in claim 2, wherein said locking bar is normally biased such that said bar prevents sufficient movement between said adapter assembly and said wall plate to allow said flanges to become disengaged from said adjacent wall portions.

4. The adapter assembly as claimed in claim 3, wherein said locking bar includes a slot in one edge thereof whereby said locking bar may be moved from the normally biased position such that the recessed area aligns with said cooperating stud to allow the adapter assembly to be moved relative to said studs to free said flange from said adjacent wall portions.

5. The adapter assembly as claimed in claim 1, wherein said recessed wall area is positioned intermediate the front and rear surfaces of said base plate.

* * * * *